(12) United States Patent
Kim (10) Patent No.: US 6,464,239 B1
(45) Date of Patent: Oct. 15, 2002

(54) AUTOMOTIVE REAR SUSPENSION SYSTEM

(75) Inventor: Jong-Yup Kim, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/718,699

(22) Filed: Nov. 21, 2000

(30) Foreign Application Priority Data

Nov. 23, 1999  (KR) ............................................. 99-52073

(51) Int. Cl.[7] ............................................. B60G 15/07
(52) U.S. Cl. ........................ 280/124.147; 280/124.141; 280/124.155
(58) Field of Search .................... 280/124.135, 124.136, 280/124.141, 124.143, 124.145, 124.146, 124.147, 124.151, 124.155, 124.154

(56) References Cited

U.S. PATENT DOCUMENTS

| 2,916,282 A | * | 12/1959 | Muller et al. | ............... 267/254 |
| 3,024,040 A | * | 3/1962 | Muller | .................. 280/86.751 |
| 4,274,655 A | * | 6/1981 | Lederman | ............ 280/124.155 |
| 5,131,638 A | * | 7/1992 | Hein et al. | ................... 267/220 |
| 5,169,171 A | * | 12/1992 | Ban et al. | ............. 280/86.753 |
| 5,536,035 A | * | 7/1996 | Bautz et al. | .......... 280/124.139 |
| 6,113,144 A | * | 9/2000 | Lapic | ......................... 280/788 |
| 6,116,626 A | * | 9/2000 | Cherry et al. | ......... 280/124.135 |

* cited by examiner

*Primary Examiner*—Paul N. Dickson
*Assistant Examiner*—David R. Dunn
(74) *Attorney, Agent, or Firm*—Christie, Parker & Hale, LLP (57) ABSTRACT

A rear suspension system for a vehicle having a rear axle centrally fixed to the vehicle body and a pair knuckles connected one to each end of the rear axle for mounting rear wheel in a wheel housing formed on left and right sides of the vehicle body, wherein the rear suspension includes upper and lower arms, one end of each respectively connected to upper and lower portions of the knuckles, a suspension mounting bracket fixed to a sidewall of the wheel housing and connected to one end of the upper arm, and a shock absorber inserted into the suspension mounting bracket at its upper portion and connected to the lower arm at its lower portion for absorbing bouncing impacts of the wheel.

5 Claims, 6 Drawing Sheets

AUTOMOTIVE REAR SUSPENSION SYSTEM

BACKGROUND OF THE INVENTION (a) Field of the Invention

The present invention relates to an automotive rear suspension system, and in particular, to an improved automotive rear suspension mounting bracket capable of reducing noise as well as modularizing suspension-mounting structure.

(b) Description of the Related Art

Figure 1:
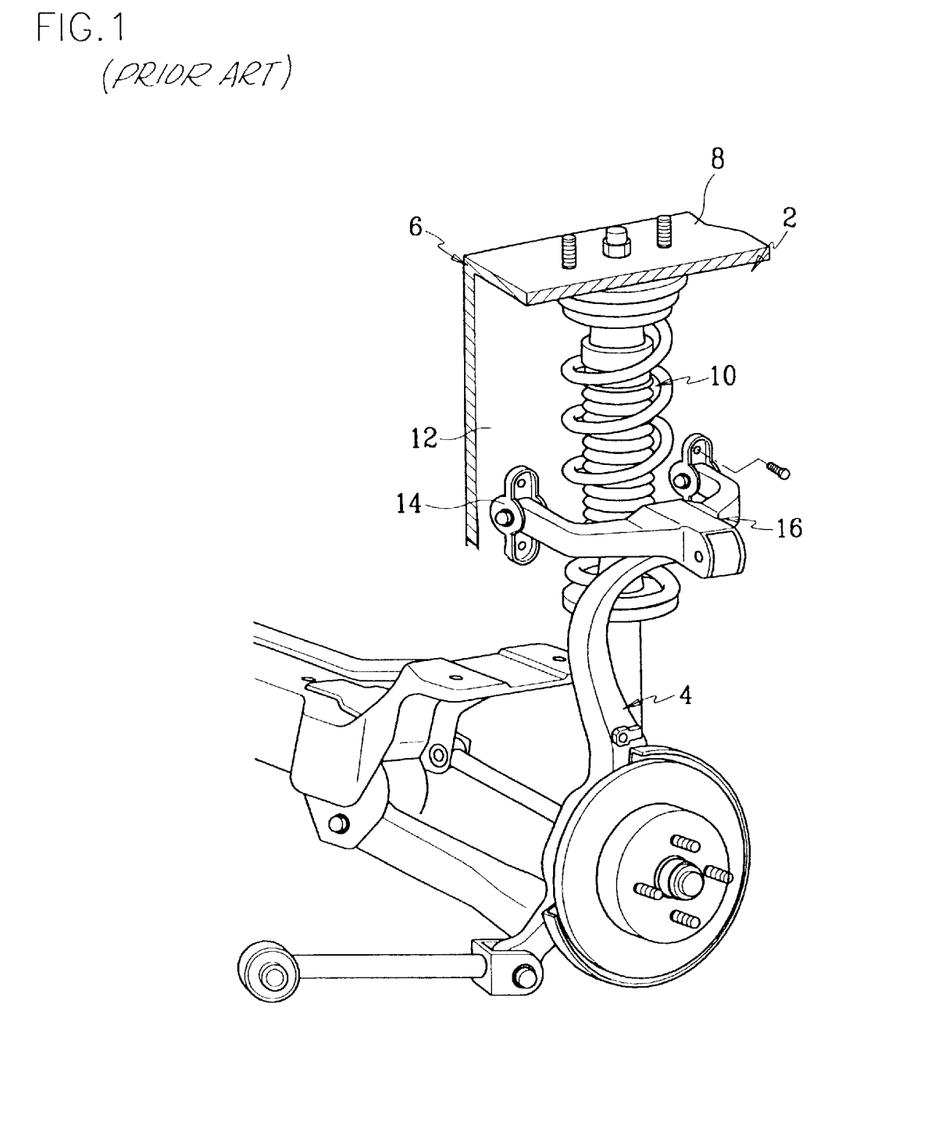
FIG. 1 is a perspective view partially showing a conventional rear suspension.
Figure 2:
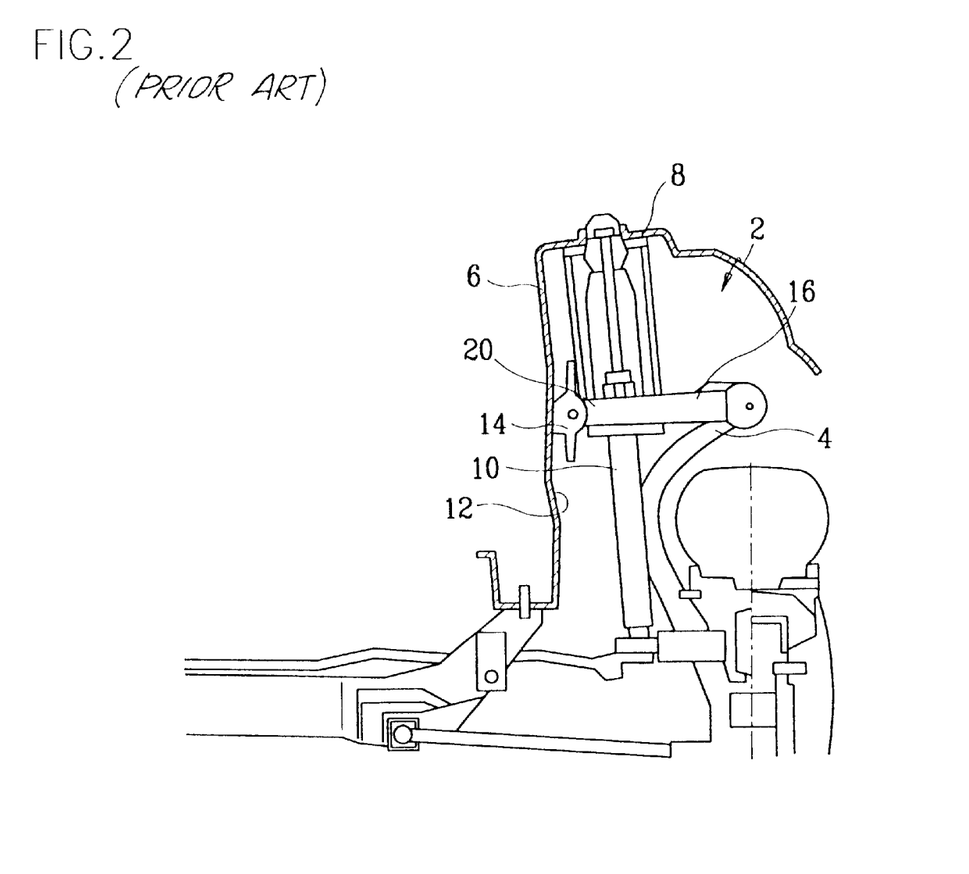
FIG. 2 is a schematic view of the rear suspension of FIG. 1 mounted to a vehicle body.

FIG. 1 and FIG. 2 are respective perspective and schematic views of a conventional rear suspension system mounted to a vehicle.

The conventional rear suspension includes a shock absorber 10 interposed between a knuckle 4 and an upper wall of a wheel housing 6, with an upper arm 16 interposed between the knuckle 4 and a sidewall of the wheel housing 6.

The upper arm 16 is, at its one end, connected to an end of an upper branch extended from the knuckle 4 and connected to the sidewall of the wheel housing at its two split ends such that the shock absorber 10 is positioned between the split portions of the upper arm 16.

In this conventional rear suspension system, the structure is such that one end of the suspension is directly connected to the upper wall of the wheel housing and the upper arm is connected to the side wall of the wheel housing, causing impact noise to easily penetrate into an interior of a vehicle.

SUMMARY OF THE INVENTION

The present invention has been made in an effort to solve the above problems of the prior art.

It is an object of the present invention to provide a rear suspension mounting-bracket capable of reducing interior noise of a vehicle and facilitating ease of assembly of the rear suspension to the vehicle body through modularization.

To achieve the above object, a rear suspension system according to the present invention comprises a knuckle for mounting a rear wheel, upper and lower arms with one end of each respectively connected to an upper and lower portion of the knuckle, a rear suspension-mounting bracket fixed to a sidewall of the wheel housing and connected to one end of the upper arm, and a shock absorber inserted into the rear suspension-mounting bracket at its upper portion and connected to the lower arm at its lower portion for absorbing bouncing impacts of the wheel, and wherein the rear suspension-mounting bracket includes a main bracket formed by assembling symmetrical first and second bracket members and an upper arm-connecting bracket mounted on one side of the main bracket for connecting the rear suspension-mounting bracket with the upper arm.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 3:
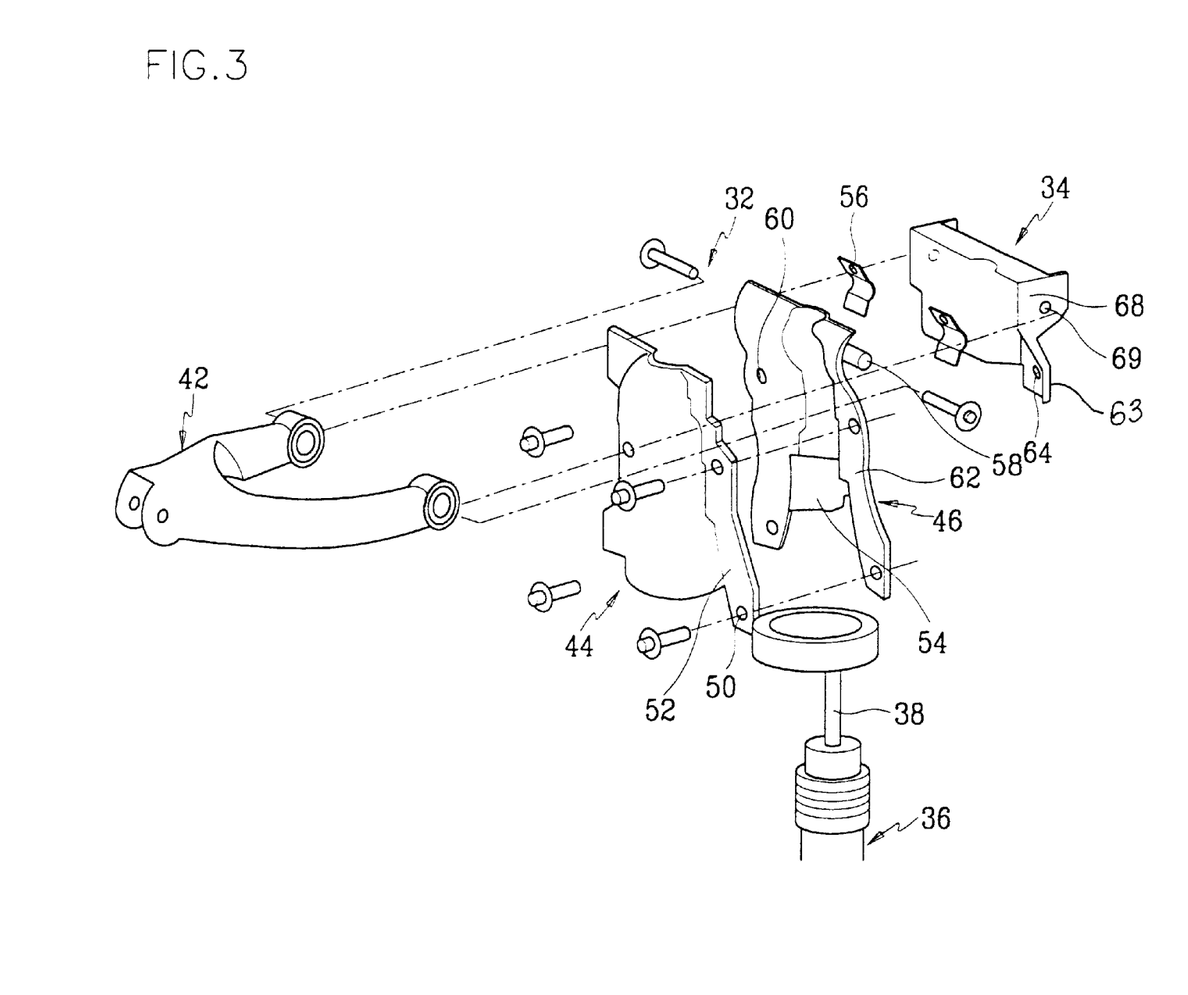
FIG. 3 is an exploded perspective view of a rear suspension-mounting bracket according to a preferred embodiment of the present invention.
Figure 4:
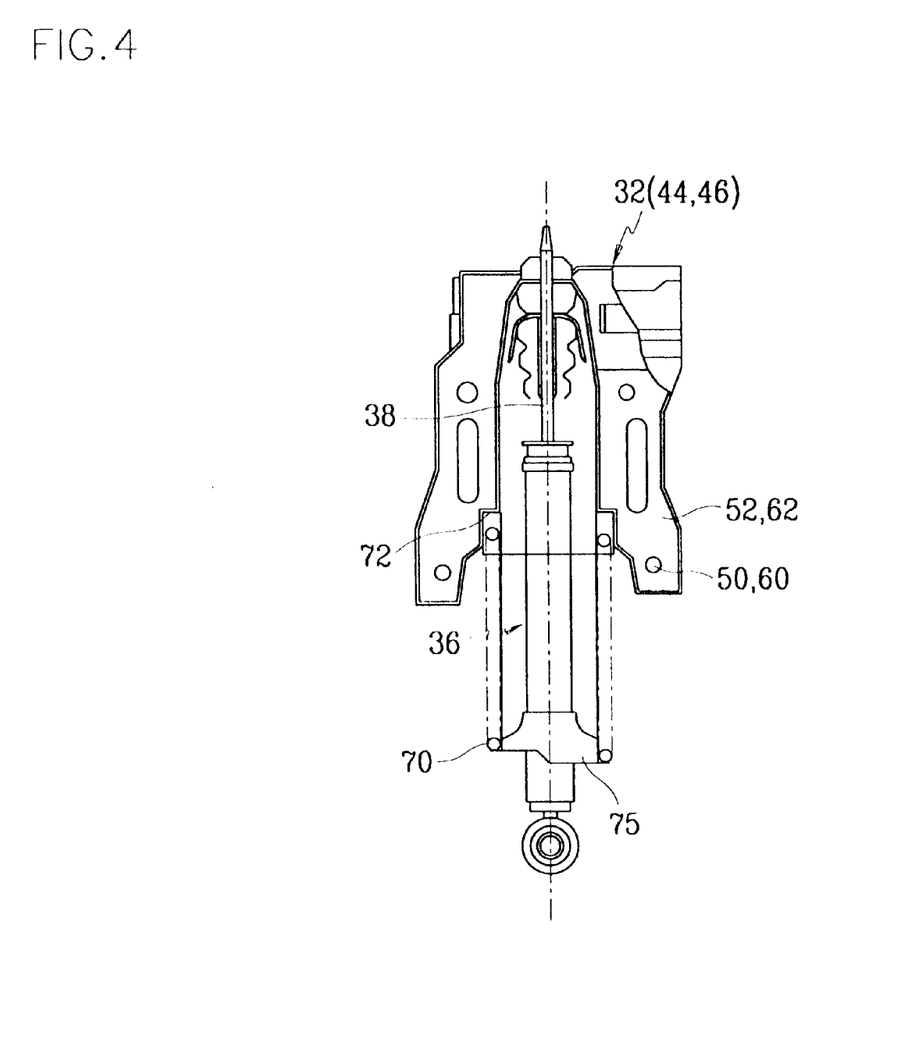
FIG. 4 is a side sectional view of the rear suspension-mounting bracket of FIG. 3.

As shown in FIG. 3 and FIG. 4, a rear suspension-mounting bracket 30 comprises a main bracket 32 and an upper arm-connecting bracket 34 mounted to one side of the main bracket 32.

The main bracket 32 has a shape of a bell formed by assembling symmetrical first and second bracket members 44 and 46 each having flanges 52 and 62 with bolt holes 50 and 60 so as to be fixed to each other. Accordingly, the main bracket 32 is provided with an inner space 54 for receiving an upper portion of a piston rod 38 of the shock absorber 36. The inner space 54 is formed having a stepped portion that acts as a spring seat 72. The second bracket member 46 is provided with a nut shaft 58 at its upper portion, the nut shaft 58 being fixed by a pair of fixing plates 56.

The upper arm-connecting bracket 34 also has flanges 63 each having a bolt hole 64 so as to be fixed to an upper portion of the main bracket 32 by screwing bolts into the bolt holes of the first and second bracket members 44 and 46 and the upper arm-connecting bracket 34. The upper arm-connecting bracket 34 is provided with an upper arm-connecting hole 69 such that the upper arm 42 is connected thereto by bolts. The other end of the upper arm 42 is connected to a knuckle where a wheel is mounted (See FIG. 5).

As shown in FIG. 4, after the rear suspension-mounting bracket 30 is assembled, a shock absorber 36 is mounted to it in such a way that the piston rod 38 of the shock absorber 36 is inserted into the mounting bracket 30, and a coil spring 70 is installed around the shock absorber 36 with one end of the spring 70 contacting the spring seat 72 and the other end contacting a spring support 75 formed around a lower portion of the shock absorber 70.

Figure 5:
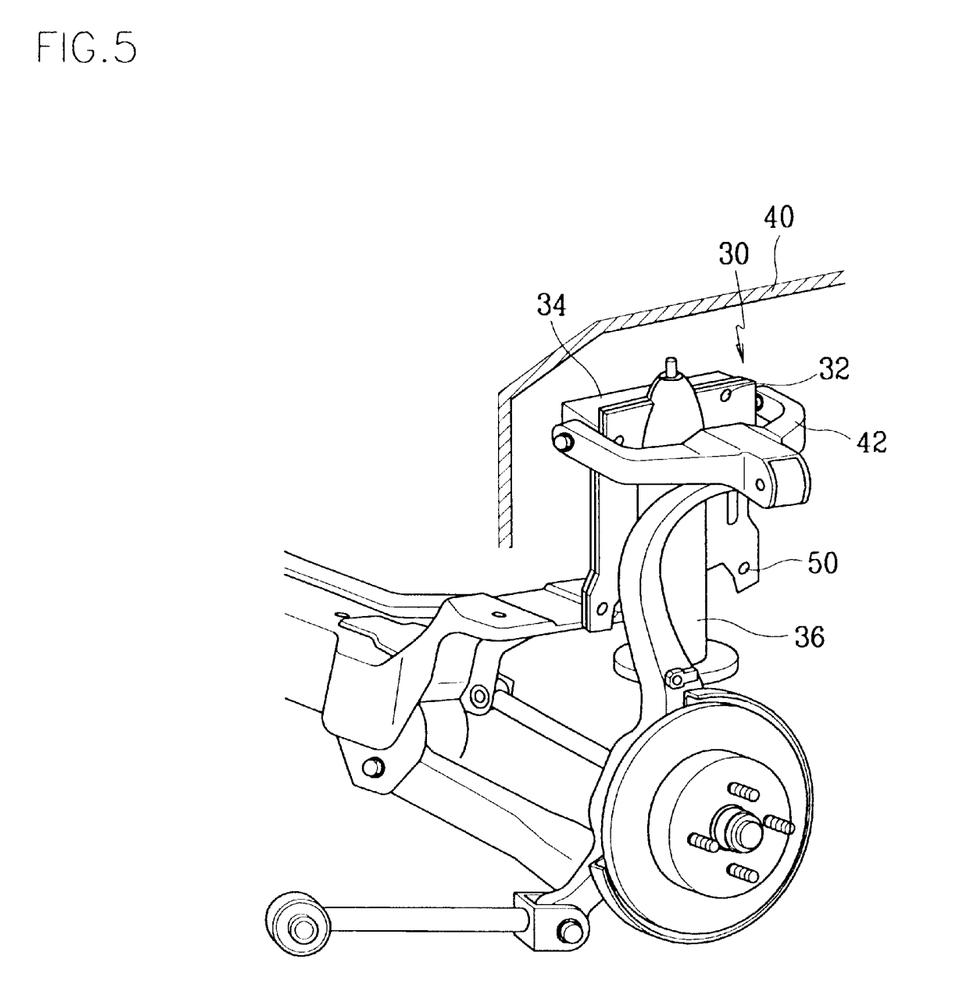
FIG. 5 is a perspective view of the rear suspension-mounting bracket of FIG. 3 as mounted to a vehicle body together with a rear suspension.
Figure 6:
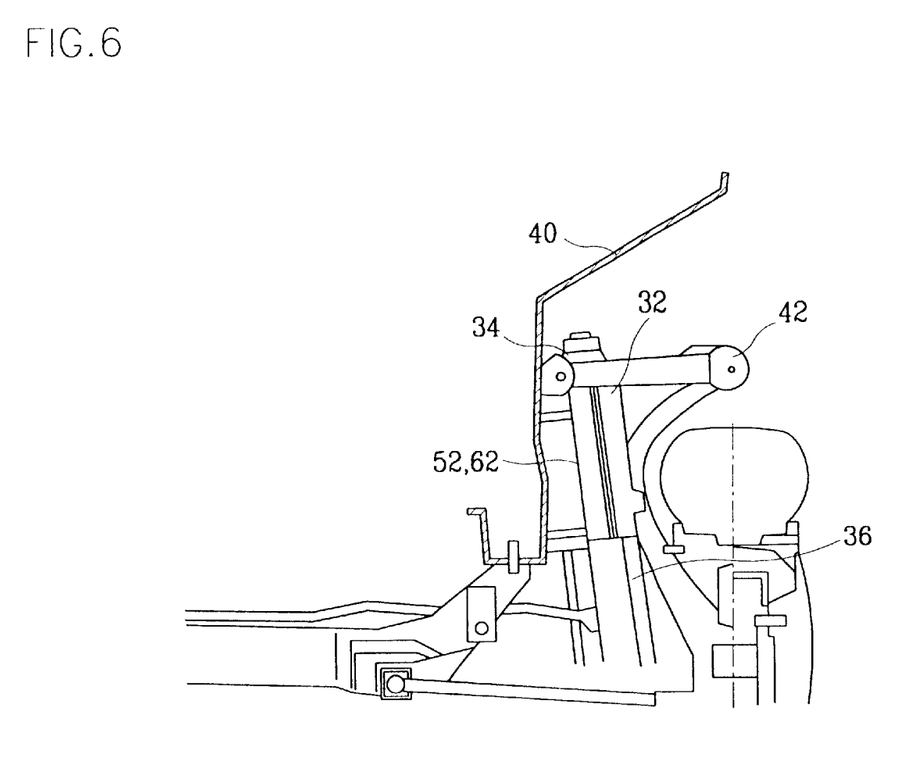
FIG. 6 is a side sectional view of the rear suspension-mounting bracket of FIG. 5 as mounted to the vehicle.

Referring to FIG. 5 and FIG. 6, the rear suspension-mounting bracket 30 is mounted to a wheel housing 40 of a vehicle by fixing the upper arm-connecting bracket 34 to the sidewall of the wheel housing 40.

As described above, since the rear suspension-mounting bracket modularizes the suspension-mounting structure, the suspension-mounting operation is easy. Furthermore, since the shock absorber is integrally mounted with the suspension-mounting bracket to the sidewall of the wheel housing without direct connection to the vehicle body, interior noise of the vehicle decreases.

While this invention has been described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

What is claimed is:

1. A rear suspension system for a vehicle having a knuckle for mounting a rear wheel, the rear suspension comprising:

an upper and lower arm, one end of each respectively connected to an upper and lower portion of the knuckle;

a rear suspension-mounting bracket fixed to a sidewall of the wheel housing and connected to one end of the upper arm; and a shock absorber inserted into the rear suspension-mounting bracket at an upper portion of the shock absorber and connected to the lower arm at a lower portion of the shock absorber for absorbing bouncing impacts of the wheel, wherein, the rear suspension-mounting bracket comprises a main bracket formed by assembling symmetrical first and second bracket members and an upper arm-connecting bracket mounted on one side of the main bracket for connecting the rear suspension-mounting bracket with the upper arm.

2. A rear suspension system of claim 1 wherein the first and second bracket members have respective flanges with bolt holes for fixing to each other.

3. A rear suspension system of claim 2 wherein the main bracket is provided with an inner space for securing the shock absorber.

4. A rear suspension system of claim 3 wherein the inner space is formed having a spring seat for contacting one end of a coil spring wound around the shock absorber.

5. A rear suspension system of claim 4 wherein the coil spring is interposed between the spring seat of the main bracket and a spring support formed around a lower portion of the shock absorber.

\* \* \* \* \*

UNITED STATES PATENT AND TRADEMARK OFFICE
CERTIFICATE OF CORRECTION

PATENT NO. : 6,464,239 B1
DATED : October 15, 2002
INVENTOR(S) : Kim

It is certified that error appears in the above-identified patent and that said Letters Patent is hereby corrected as shown below:

Title page,
Item [57], ABSTRACT,
Line 2, after "pair" insert -- of --
Line 3, after "mounting" insert -- a --

Drawings,
Sheet 4, Fig. 4, delete drawing sheet 4 and substitute therefor the drawing sheet, consisting of Fig. 4, as shown on the attached page Column 4,
Line 4, replace "claim 2" with -- claim 1 --
Line 7, replace "claim 3" with -- claim 2 --

Signed and Sealed this

Twenty-first Day of June, 2005

JON W. DUDAS
*Director of the United States Patent and Trademark Office*